F. KUHN, J. A. HAND, AND J. G. SPIESS.
ELECTRICALLY HEATED TOOL.
APPLICATION FILED JAN. 25, 1919.
1,316,368.
Patented Sept. 16, 1919.
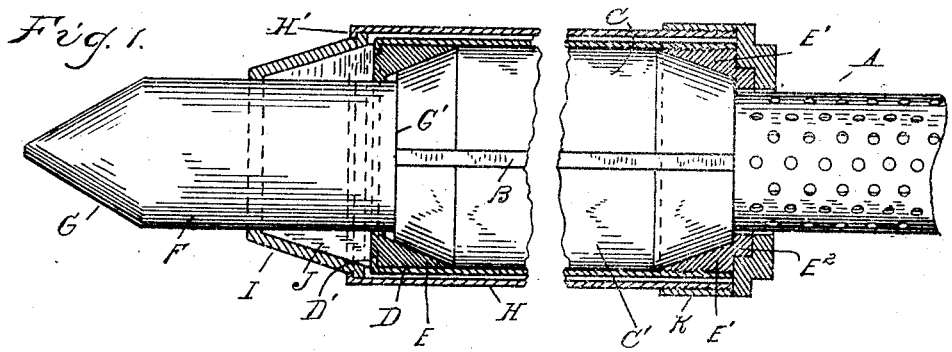
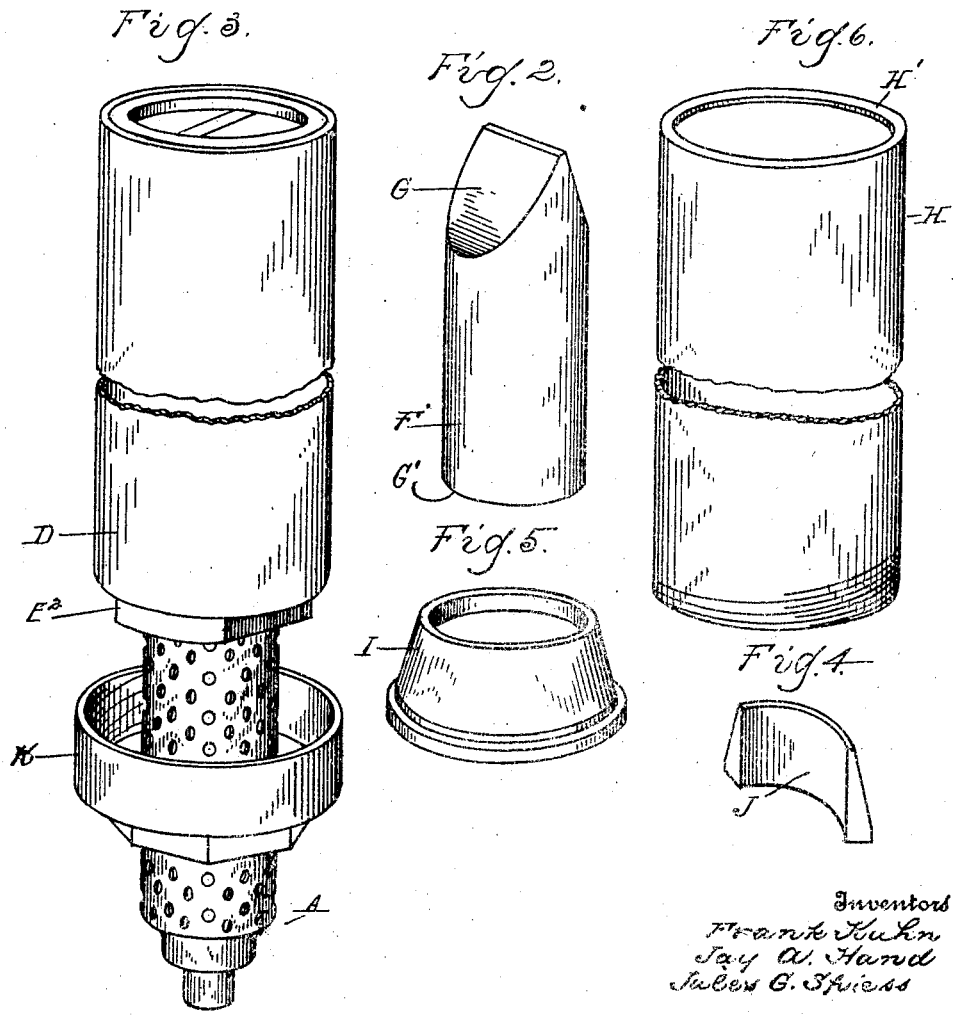

UNITED STATES PATENT OFFICE.

FRANK KUHN, JAY A. HAND, AND JULES G. SPIESS, OF DETROIT, MICHIGAN, ASSIGNORS TO AMERICAN ELECTRICAL HEATER COMPANY, OF DETROIT, MICHIGAN, A CORPORATION OF MICHIGAN.

ELECTRICALLY-HEATED TOOL.

1,316,368.  Specification of Letters Patent.  Patented Sept. 16, 1919.

Application filed January 25, 1919. Serial No. 273,077.

*To all whom it may concern:*

Be it known that we, FRANK KUHN, JAY A. HAND, and JULES G. SPIESS, all citizens of the United States of America, residing at Detroit, in the county of Wayne and State of Michigan, have invented certain new and useful Improvements in Electrically-Heated Tools, of which the following is a specification, reference being had therein to the accompanying drawing.

The invention relates to electrically heated tools, such as soldering irons, and consists of a construction which facilitates the attachment and detachment of the soldering point, and further in various features of construction as hereinafter set forth.

In the drawings:

Figure 1 is a longitudinal section through the tool;

Figs. 2, 3, 4, 5 and 6 are perspective views of the various elements of the tool detached.

A is the shank of the tool for attachment to a handle (not shown), B the heating unit, preferably a flat insulated and armored element, and C C' are heat-absorbing and distributing members on opposite sides of the element and forming thereof complementary portions of a cylinder.

In soldering tools the point is usually formed of copper and it is desirable to employ rolled stock in forming the same. To permit of the use of such material I have devised a construction for rigidly clamping the point and maintaining the same in good heat-conducting relation to the heat-distributing bodies C C' which embrace the unit B. As shown, D is a cylindrical sleeve surrounding the members C C', and E E' are wedge rings at opposite ends of this sleeve which engage tapering ends of the members C C'. The ring E is secured to the sleeve D by an inturned flange D' and the ring E' is externally threaded for engaging an internally threaded portion of the sleeve D. Thus by screwing up the ring E', which is provided with a wrench-hold portion E², the members C C' will be clamped into firm contact with the element B. The soldering point F is formed of round bar stock, having its forward end beveled, as indicated at G, and its rear end G' cut off in a plane perpendicular to its longitudinal axis. To transfer the heat from the members C C' to the point F the end G' thereof must be held in close contact with the forward ends of said members C C'. For this purpose a second sleeve H surrounds the sleeve D, being slightly spaced therefrom to form an air gap for heat insulation. At the forward end of this sleeve is a ring member I, the aperture in which will receive the member F, said ring being tapered externally and internally. J are segmental wedge members fitting within the ring I, their inner faces being cylindrical segments for fitting the member F. The sleeve H engages the ring I by means of an inturned flange H' and at the opposite end of the sleeve H is a ring K which is internally threaded to engage a threaded portion of the sleeve and is also provided with a bearing portion for engaging the end of the ring E'. The construction is such that by screwing up the ring K the sleeve H will be drawn rearward, carrying with it the tapering ring I which bears against the wedge members J. The latter abut against the ring E and consequently any rear movement of the sleeve H will have the effect of forcing the wedges radially inward so as to clamp the cylindrical member F. Thus the screwing up of the member K will simultaneously clamp the point member F and draw the same rearward; thereby pressing the rear faces G' against the forward ends of the members C and C'. This will produce good heat-conducting contact so that the heat which is transmitted from the unit to the members C C' will be conducted into the member F.

With the construction as described, whenever it is desired to remove the point F either for re-shaping the same or for purpose of renewal, this can be quickly done without disturbing either the element B or the heat-distributing bodies C C'. This is desirable as the heating of these bodies has a tendency to warp or distort the same so that when unclamped it is difficult to secure as good contact for heat conduction. On the other hand, the contact between the members C C' and the point F being an end contact there is little tendency for these surfaces to become distorted.

What we claim as our invention is:

1. In an electrically heated tool, the combination with a flat heating unit and heat distributing bodies on opposite sides thereof forming complementary portions of a cylinder, of a sleeve surrounding said heat-distributing bodies, means operated by an endwise movement of said sleeve for clamping said heat-distributing bodies against said unit, a member to be heated having end contact with said heat-distributing bodies, a clamp for engaging said member, and a sleeve surrounding said first-mentioned sleeve, engaging said clamping means to actuate the same by an endwise movement.

2. In an electrically heated tool, the combination with a heating and distributing unit of cylindrical form, of a member to be heated having end contact with said heating and distributing unit, a clamp for engaging said member, a sleeve surrounding and spaced from said heating and distributing unit engaging said clamp, and means at the rear end of said heating and distributing unit for drawing said sleeve rearward to simultaneously clamp said member and press the same endwise against said unit.

3. In an electrically heated tool, the combination with a flat heating unit and heat-distributing bodies on opposite sides thereof having tapering ends, of wedge rings engaging the tapering ends of said bodies, a sleeve surrounding said bodies and connecting said rings with a threaded engagement with one thereof, a member to be heated having end contact with said heat-distributing bodies, a tapering ring surrounding said member, a plurality of wedges within said tapering ring and fitting against said member, a sleeve engaging said tapering ring and surrounding said first-mentioned sleeve, being spaced therefrom, and a ring member at the rear end of said sleeve having a threaded engagement therewith and bearing against the ring engaging the first-mentioned sleeve, for the purpose described.

In testimony whereof we affix our signatures.

FRANK KUHN.
JAY A. HAND.
JULES G. SPIESS.